United States Patent
Jain

(10) Patent No.: US 10,230,591 B2
(45) Date of Patent: Mar. 12, 2019

(54) NETWORK RESOURCE GOVERNANCE IN MULTI-TENANT DATACENTERS

(71) Applicant: Microsoft Technology Licensing, LLC, Redmond, WA (US)

(72) Inventor: Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 696 days.

(21) Appl. No.: 14/502,857

(22) Filed: Sep. 30, 2014

(65) Prior Publication Data

US 2016/0094413 A1    Mar. 31, 2016

(51) Int. Cl.
*H04L 12/24* (2006.01)
*H04L 12/873* (2013.01)
*H04L 12/877* (2013.01)
*H04L 12/813* (2013.01)

(52) U.S. Cl.
CPC ......... *H04L 41/5019* (2013.01); *H04L 47/52* (2013.01); *H04L 47/525* (2013.01)

(58) Field of Classification Search
None
See application file for complete search history.

(56) References Cited

U.S. PATENT DOCUMENTS

| | | | |
|---|---|---|---|
| 8,392,575 B1 | 3/2013 | Marr | |
| 8,424,059 B2 | 4/2013 | Kwok et al. | |
| 8,671,407 B2 | 3/2014 | Ballani et al. | |
| 2013/0014101 A1* | 1/2013 | Ballani | H04L 67/101 718/1 |
| 2013/0074091 A1* | 3/2013 | Xavier | G06F 9/5011 718/104 |
| 2013/0185438 A1 | 7/2013 | Lumezanu et al. | |
| 2013/0198740 A1* | 8/2013 | Arroyo | H04L 41/0806 718/1 |
| 2013/0298123 A1* | 11/2013 | Zuo | H04L 47/20 718/1 |
| 2014/0079207 A1 | 3/2014 | Zhakov et al. | |
| 2014/0258535 A1* | 9/2014 | Zhang | H04L 41/0806 709/226 |
| 2015/0058474 A1* | 2/2015 | Bloom | H04L 47/2425 709/224 |
| 2015/0134830 A1* | 5/2015 | Popa | H04L 49/00 709/226 |

OTHER PUBLICATIONS

Ballani, et al., "Towards predictable datacenter networks", In Proceedings of the ACM SIGCOMM conference, Aug. 15, 2011, pp. 242-253.

(Continued)

*Primary Examiner* — Philip J Chea
*Assistant Examiner* — Hassan A Khan
(74) *Attorney, Agent, or Firm* — Workman Nydegger

(57) ABSTRACT

Bandwidth requirement specifications in a multi-tenant datacenter are implemented using resource-bundle level queues and tenant level queues. Data is transmitted via the resource-bundle level queues and the tenant level queues according to the bandwidth requirement specifications, such that minimum bandwidth requirements are maintained for data being transmitted and for data being received.

20 Claims, 15 Drawing Sheets

(56) References Cited

OTHER PUBLICATIONS

Divakaran, et al., "An Online Integrated Resource Allocator for Guaranteed Performance in Data Centers", In Proceedings of IEEE Transactions on Parallel and Distributed Systems, Issue 99, Aug. 23, 2013, 11 pages.
Gember, et al., "Stratos: Virtual Middleboxes as First-Class Entities", In Technical Report TR1771, Jun. 2012, 15 pages.
Thereska, et al., "IOFlow: a software-defined storage architecture", In Proceedings of the Twenty-Fourth ACM Symposium on Operating Systems Principles, Nov. 3, 2013, pp. 182-196.

* cited by examiner

Thank you for allowing us to meet your datacenter needs.

Please answer the questions below to specify your bandwidth guarantee requirements.

Number of Virtual Machines to be hosted: [ ]   [ ] Check here if you do NOT wish to specify bandwidth guarantee requirements.
(Optional – if you leave this blank, the Bandwidth specification will be applied to all existing and future virtual machines.)   "Best Effort" bandwidth allocation will be used.

Guaranteed Inbound Bandwidth per Virtual Machine:
(Note: You may leave this blank and only specify a Total Bandwidth per Virtual Machine)

[ ] packets per second    OR    [ ] bits per second

Guaranteed Outbound Bandwidth per Virtual Machine:
(Note: You may leave this blank and only specify a Total Bandwidth per Virtual Machine)

[ ] packets per second    OR    [ ] bits per second

Guaranteed Total Bandwidth per Virtual Machine:

[ ] packets per second    OR    [ ] bits per second

NEXT

FIG. 6

Thank you for allowing us to meet your datacenter needs.

Please answer the questions below to specify your bandwidth guarantee requirements.

☐ I would like to specify bandwidth guarantee requirements in terms of total bandwidth to be shared across all of my virtual machines.

☐ I would like to specify bandwidth guarantee requirements in terms of total bandwidth per virtual machine.

☐ I would like to specify bandwidth guarantee requirements in terms of inbound bandwidth and outbound bandwidth per virtual machine.

☐ I would like to specify bandwidth guarantee requirements in terms of total bandwidth for data transmissions to/from other services.

☐ I would like to specify bandwidth guarantee requirements in terms of inbound bandwidth and outbound bandwidth for data transmissions to/from other services.

☐ I do NOT wish to specify bandwidth requirements. I understand "Best Effort" bandwidth allocation will be used if I make this selection.

☐ The datacenter continuously measures your tenant's network bandwidth usage and can adjust the bandwidth to reduce your costs (e.g., reducing bandwidth limits if it is under-used) or improving performance (e.g., increasing bandwidth limits if it is close to 100% utilization. Check the box if you would like to enable this feature.

[ NEXT ]

FIG. 7

Thank you for allowing us to meet your datacenter needs.

Please answer the questions below to specify your bandwidth guarantee requirements.

Guaranteed Total Bandwidth:

Packets per Second

☐ 10,000
☐ 20,000
☐ 30,000
☐ 40,000
☐ 50,000

OR

Megabits per Second

☐ 10
☐ 50
☐ 100
☐ 500
☐ 1000

NEXT

Thank you for allowing us to meet your datacenter needs.

Please answer the questions below to specify your bandwidth guarantee requirements.

Guaranteed Inbound/Outbound Bandwidth per Virtual Machine:

| Inbound Mbps | Price/VM/Day | | Outbound Mbps | Price/VM/Day |
|---|---|---|---|---|
| ☐ 10 | $5 | | ☐ 10 | $5 |
| ☐ 50 | $10 | | ☐ 50 | $10 |
| ☐ 100 | $15 | | ☐ 100 | $15 |
| ☐ 250 | $20 | | ☐ 250 | $20 |
| ☐ 500 | $25 | | ☐ 500 | $25 |
| ☐ 750 | $30 | | ☐ 750 | $30 |
| ☐ 1000 | $35 | | ☐ 1000 | $35 |

NEXT

FIG. 9

Thank you for allowing us to meet your datacenter needs.

Please answer the questions below to specify your bandwidth guarantee requirements.

Guaranteed Inbound/Outbound Bandwidth per Service Type:

| Storage Services | | Authentication Services | | Other Services | |
|---|---|---|---|---|---|
| Inbound Mbps | Outbound Mbps | Inbound Mbps | Outbound Mbps | Inbound Mbps | Outbound Mbps |
| ☐ 10 | ☐ 10 | ☐ 10 | ☐ 10 | ☐ 10 | ☐ 10 |
| ☐ 50 | ☐ 50 | ☐ 50 | ☐ 50 | ☐ 50 | ☐ 50 |
| ☐ 100 | ☐ 100 | ☐ 100 | ☐ 100 | ☐ 100 | ☐ 100 |
| ☐ 250 | ☐ 250 | ☐ 250 | ☐ 250 | ☐ 250 | ☐ 250 |
| ☐ 500 | ☐ 500 | ☐ 500 | ☐ 500 | ☐ 500 | ☐ 500 |
| ☐ 750 | ☐ 750 | ☐ 750 | ☐ 750 | ☐ 750 | ☐ 750 |
| ☐ 1000 | ☐ 1000 | ☐ 1000 | ☐ 1000 | ☐ 1000 | ☐ 1000 |

NEXT

NETWORK RESOURCE GOVERNANCE IN MULTI-TENANT DATACENTERS

BACKGROUND

Datacenters are typically implemented as a collection of server computer systems, which may host a plurality of virtual machines. These virtual machines may provide remote services that are available to client computing devices. For example, a company may rent one or more virtual machines through a datacenter to host various applications that are accessible to the company's customers via a web interface.

Various factors affect the performance of remote services that are hosted by datacenters, including, but not limited to the physical hardware configuration of the datacenter and how available bandwidth is allocated across the various virtual machines and services.

SUMMARY

Techniques for enabling network resource governance in a multi-tenant datacenter are described. Tenant level queues and resource-bundle-level queues are implemented according to a tenant-provided bandwidth requirement specification. The bandwidth requirement specification may specify total bandwidth requirements or inbound/outbound bandwidth requirements at the resource bundle level, at the tenant level, or for any defined group of resource bundles or services.

BRIEF DESCRIPTION OF THE DRAWINGS

The same numbers are used throughout the drawings to reference like features and components.

FIGS. 6-10 are pictorial diagrams of example resource specification user interface screens.

DETAILED DESCRIPTION

The following discussion is directed to network resource governance in a multi-tenant datacenter. Each tenant may have any number of resource bundles, such as virtual machines. By specifying bandwidth requirements, the tenant can ensure that each virtual machine that is associated with the tenant will be allocated the required bandwidth. As described herein, tenants may choose to specify bandwidth at various levels. For example, bandwidth requirements may be specified based on inbound and outbound traffic for each virtual machine, total traffic for each virtual machine, inbound and outbound traffic for all virtual machines associated with the tenant, total traffic for all virtual machines associated with the tenant, inbound and outbound (or total) traffic for communications between specific groups of virtual machines, or inbound and outbound (or total) traffic for communications between any virtual machine of the tenant and various types of services provided by other tenants.

As used herein, the terms "tenant", "application", and "service" may be used interchangeably.

Example Multi-Tenant Datacenter

Figure 1:
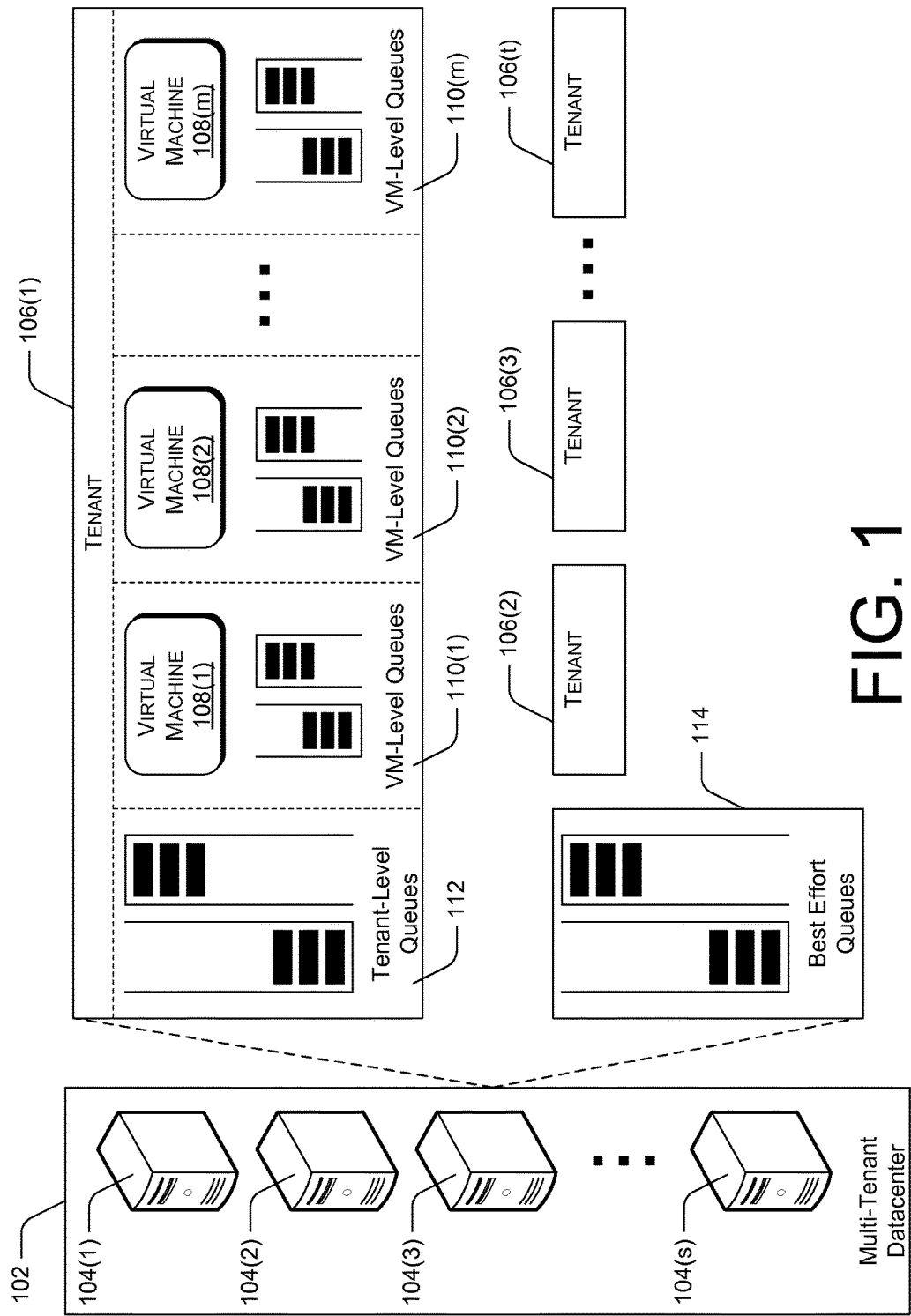
FIG. 1 is a pictorial diagram of an example multi-tenant datacenter.

FIG. 1 illustrates an example multi-tenant datacenter 102, which may be implemented in a distributed environment across multiple servers 104(1), 104(2), 104(3) . . . 104(s). Each tenant 106 may implement any number of resource bundles within the multi-tenant datacenter 102. In the illustrated example, each resource bundle is a virtual machine 108. Other examples of resource bundles include, but are not limited to, a server, a rack, a cluster, dedicated storage, and so on. As used herein, a "resource bundle" may include any set of computing resources to support an application, which may include, by example and not limitation, any combination of one or more of a processor, memory, storage, and network resources. Each tenant is able to specify bandwidth requirements for their resource bundles. Based on the specified bandwidth requirements, the multi-tenant datacenter implements, for each virtual machine (VM) 108, a pair of VM-level queues 110—one inbound and one outbound. The rate at which data is processed through the queues is determined based on the tenant's bandwidth specification. Additionally, the multi-tenant datacenter implements, for each tenant, a pair of tenant-level queues 112—one inbound and one outbound. The rate at which data is processed through the tenant-level queues is also determined based on the tenant's bandwidth specification. In an example implementation, the bandwidth for a tenant-level queue may be specified in a bandwidth specification. In another example implementation, the bandwidth for one or more tenant-level queue may be determined based, at least in part, on specified bandwidths for the VM-level queues. For example, bandwidth for a tenant-level queue may be based, at least in part on a sum of VM-level queue bandwidths or a maximum or minimum bandwidth among VM-level queues. Example multi-tenant datacenter 102 also includes a pair of best effort queues 114. Best effort queues 114 are implemented to support data transmission to and from virtual machines associated with tenants who choose to not specify any bandwidth requirements.

Figure 2:
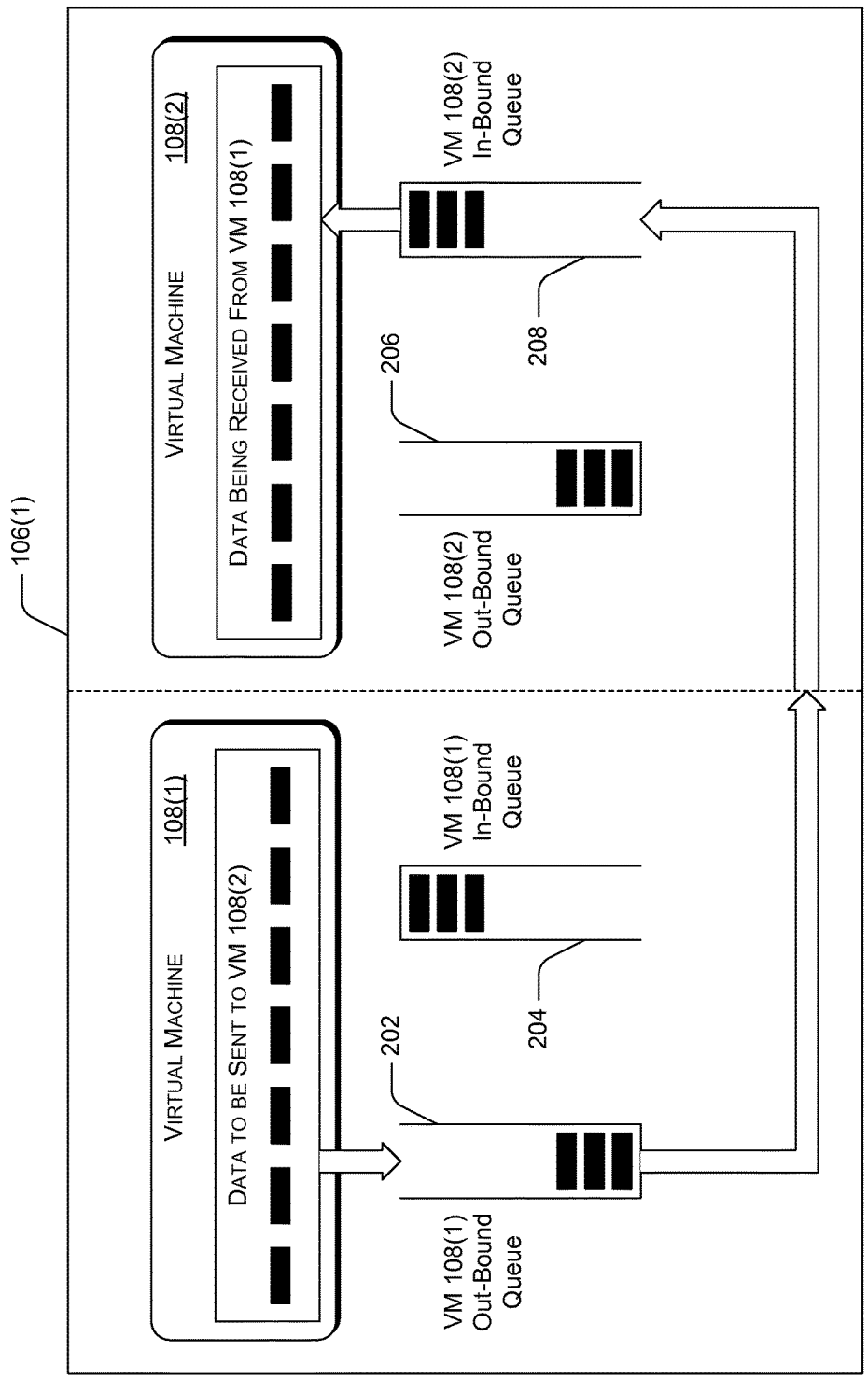
FIG. 2 is a pictorial diagram of an example data transmission between two virtual machines associated with the same tenant.

FIG. 2 illustrates an example intra-tenant data transmission from one virtual machine to another virtual machine, where both virtual machines are associated with the same tenant. For example, as illustrated in FIGS. 1 and 2, tenant 106(1) controls virtual machine 108(1) and virtual machine 108(2). As described above with reference to FIG. 1, each virtual machine has an associated pair of virtual machine queues. In the illustrated example, virtual machine 108(1) has an outbound queue 202 and an inbound queue 204. Similarly, virtual machine 108(2) has an outbound queue 206 and an inbound queue 208. As virtual machine 108(1) transmits data to virtual machine 108(2), the data is transmitted out of virtual machine 108(1) using the outbound queue 202 associated with virtual machine 108(1). Similarly, the data is received at virtual machine 108(2) using the inbound queue 208 associated with virtual machine 108(2).

Figure 3:
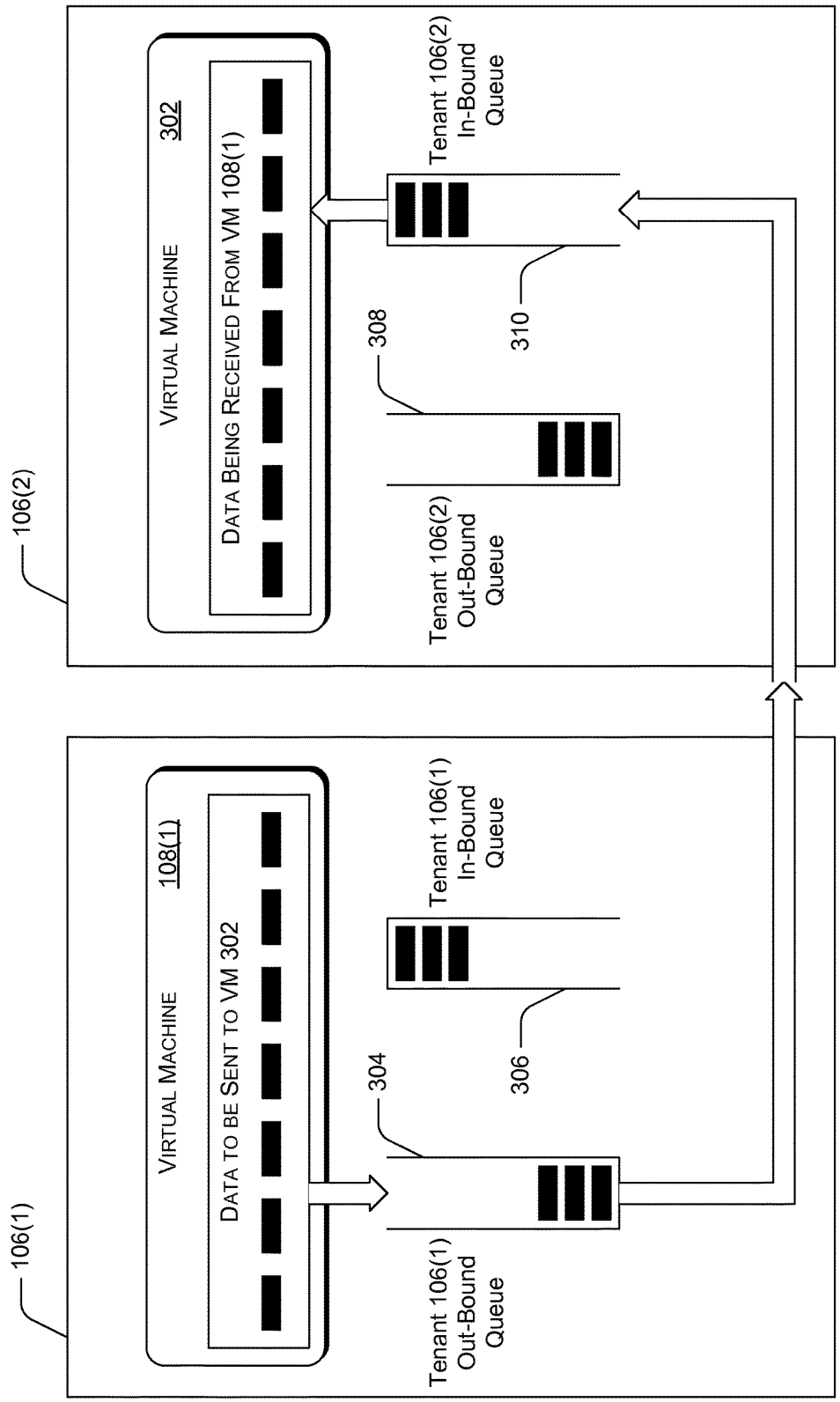
FIG. 3 is a pictorial diagram of an example data transmission between two tenants.

FIG. 3 illustrates an example inter-tenant data transmission from a virtual machine associated with one tenant to a virtual machine associated with another tenant. As illustrated in FIG. 3, tenant 106(1) controls virtual machine 108(1), and tenant 106(2) controls virtual machine 302. As described above with reference to FIG. 1, each tenant has an associated pair of tenant-level queues. In the illustrated example, tenant 106(1) has an outbound tenant-level queue 304 and an inbound tenant-level queue 306. Similarly, tenant 106(2) has an outbound tenant-level queue 308 and an inbound tenant-level queue 310. As virtual machine 108(1) transmits data to virtual machine 302, because the sending and receiving virtual machines are associated with different tenants, the data is transmitted out of virtual machine 108(1) using the tenant-level outbound queue 304 associated with tenant 106(1). Similarly, the data is received at virtual machine 302 using the inbound tenant-level queue 310 associated with tenant 106(2).

Example Multi-Tenant Datacenter Architecture

Figure 4:
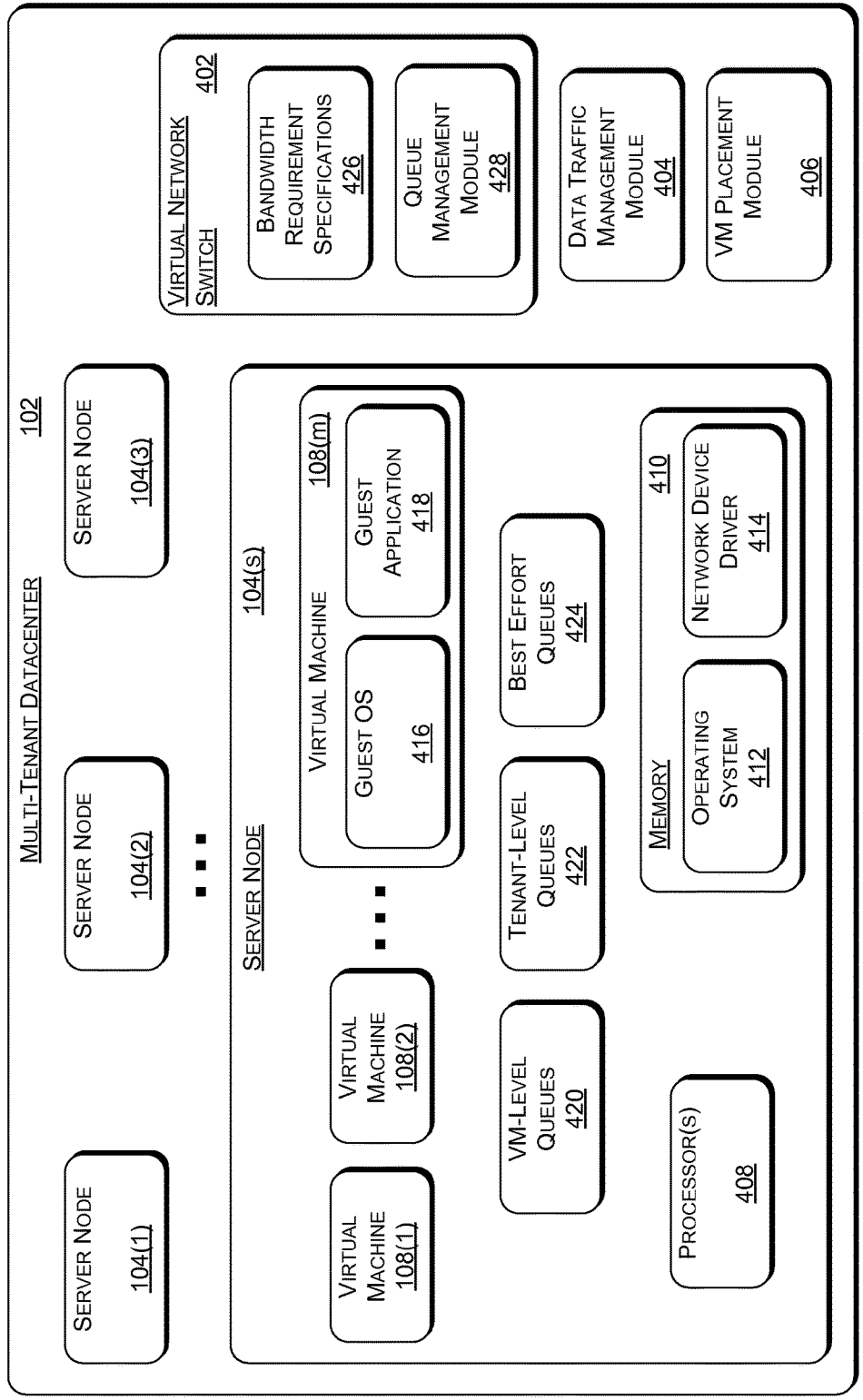
FIG. 4 is a block diagram of selected components of an example multi-tenant datacenter.

FIG. 4 illustrates select components of an example multi-tenant datacenter 102, as illustrated in FIG. 1. Multi-tenant datacenter 102 includes one or more server nodes 104, a virtual network switch 402, a data traffic management module 404, and a virtual machine placement module 406. The virtual network switch 402 provides a logical model of the datacenter in which the individual server nodes 104 are connected. In this way, the physical network topology is decoupled from the logical data plane. Bandwidth requirement specifications, as described herein, are implemented to respect the constraints of the physical network topology such as capacity, connectivity, and system-wide bandwidth limitations, which may be affected by, for example, packet buffers on switches in the physical network topology.

As illustrated, an example server node 104(s) may include one or more processors 408 and a memory 410. An operating system 412 and a network device driver 414 are stored in memory 410 and executed, at least in part, by processor 408. Example server node 104(s) also includes virtual machines 108(1), 108(2) . . . 108(m). The virtual machines hosted by a particular server node may be associated with a single tenant or individual ones of the virtual machines may be associated with different tenants. Furthermore, a resource bundle (e.g., different from a virtual machine) may be distributed across multiple server nodes. For example, some components of a particular resource bundle may be hosted by one server node and other components of the same resource bundle may be hosted by a different server node.

In an example implementation, a virtual machine 108(m) may include a guest operating system (OS) 416 and a guest application 418. Guest operating system 416 may be the same type of operating system or a different type of operating system than operating system 412. Guest application 418 may be any type of application, including, but not limited to, an authentication service, a storage service, an entertainment application, a productivity application, and so on.

In an example implementation, server node 104(s) also includes virtual machine-level queues 420, tenant-level queues 422, and best effort queues 424

VM-level queues 420 provide data transmission between virtual machines of the same tenant according to a bandwidth requirement specification.

Tenant-level queues 422 provide data transmission between multiple tenants according to a bandwidth requirement specification.

Best effort queues 424 provide data transmission to or from tenants that do not have an associated bandwidth requirement specification.

In an example implementation, virtual network switch 402 includes bandwidth requirement specifications 426 and queue management module 428. Bandwidth requirement specifications 426 maintain bandwidth requirements specified by a tenant. Bandwidth requirements may be specified for a variety of granularities. For example, a tenant may submit a bandwidth requirement specification that merely indicates a total bandwidth to be shared across the virtual machines associated with the tenant. In contrast, another tenant may submit a bandwidth requirement specification that indicates an inbound bandwidth for each virtual machine associated with the tenant and an outbound bandwidth for each virtual machine associated with the tenant. As yet another example, a tenant may submit a bandwidth requirement that defines groups of virtual machines associated with the tenant, and that indicates inbound and outbound bandwidth requirements for data transmissions between the virtual machine groups. Another tenant may further submit a bandwidth requirement specification that specifies inbound and outbound bandwidth requirements for transmissions between the tenant and other types of services, such as, for example, storage or authentication services.

Queue management module 428 maintains the various queues of the multi-tenant data center, by creating queues when virtual machines are created, deleting queues when virtual machines are deleted, enforcing queue rates according to the bandwidth specifications, and adjusting queue rates when virtual machines are added or deleted or when bandwidth requirement specifications are modified. In an example implementation, queue management module 428 may be implemented as an application programming interface (API). As an example, an API to support bandwidth requirement specifications may include the following example functions:

AddQueue (Identifier ID, Direction Dir, Rate R)
    ID is a GUID for a VM or a tenant
    Dir is a bit variable: inbound or outbound
    The function returns a queue identifier QID
DeleteQueue (QueueID QID), returns the following:
    Identifier ID denoting the VM or tenant GUID
    Direction Dir
    Current rate setting R
AdjustQueueRate (Queue QID, Rate R)
    Returns a code (0,1) on success after the rate is set.

Data traffic management module 404 manages data transmissions through the various queues 420, 422, and 424 based on the bandwidth requirement specifications 426.

VM placement module 406 controls the physical implementation of virtual machines 108 based on the physical limitations and constraints of the multi-tenant datacenter 102. Physical limitations and constraints that may affect the physical implementation of the virtual machines may include, for example, network bandwidth capacity and network connectivity.

The components illustrated in FIG. 4 may be implemented as any combination of hardware and software. In particular, the functionality of virtual network switch 402, data traffic module 404, and VM placement module 406 can be performed, at least in part, by one or more hardware logic components. For example, and without limitation, illustrative types of hardware logic components that can be used include Field-programmable Gate Arrays (FPGAs), Network-FPGAs (Net-FPGAs), Application-specific Integrated Circuits (ASICs), Application-specific Standard Products (ASSPs), System-on-a-chip systems (SOCs), Complex Programmable Logic Devices (CPLDs), etc.

Virtual machines 108, virtual network switch 402, data traffic management module 404, and VM placement module 406 may be implemented as software components that are stored in memories associated with one or more server nodes 104 and executed on processors associated with one or more server nodes 104. Any of the components illustrated in FIG. 4 may be implemented using any form of computer-readable media that is accessible by multi-tenant data center 102 either locally or remotely, including over a network. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Example Bandwidth Requirement Specifications

Figure 5:
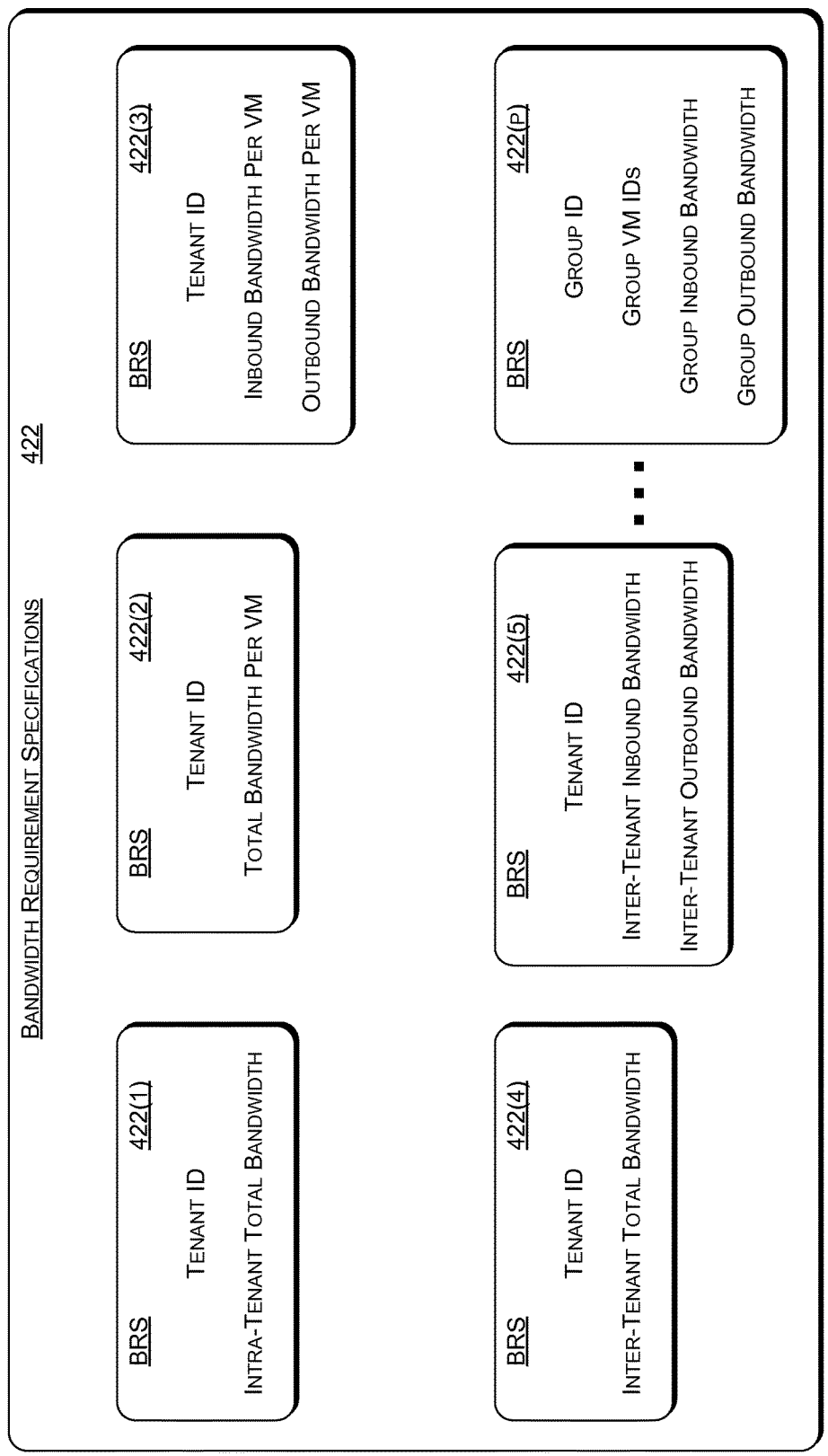
FIG. 5 is a block diagram of example bandwidth requirement specifications.

FIG. 5 illustrates examples of various types of bandwidth requirement specifications. Bandwidth requirement specifications (BRS) 422 may include, for example, BRS 422(1), BRS 422(2), BRS 422(3), BRS 422(4), BRS 422(5), . . . , BRS 422(p).

Example BRS 422(1) represents a bandwidth requirement specification that specifies, for a particular tenant, an intra-tenant total bandwidth. In this example, the total bandwidth may be divided across the virtual machines associated with the tenant. For example, if the specified total bandwidth is 100 Mbps and the tenant has five virtual machines, then data transmissions between any of the five virtual machines is managed such that each of the five virtual machines is allocated 20 Mbps of bandwidth. In an alternate implementation, the specified bandwidth is divided across only those virtual machines associated with the tenant that are currently active. For example, if the tenant has five virtual machines, but only four are currently active, then the 100 Mbps is divided across the four active VMs, thereby allocating 25 Mbps of bandwidth to each of the four active VMs. If the number of virtual machines associated with the tenant changes (e.g., more VMs are added or VMs are deleted), the specified total bandwidth remains the same (unless the tenant chooses to change it). At any given time, the specified total bandwidth is allocated across the current number of VMs (or active VMs) associated with the tenant.

Example BRS 422(2) represents a bandwidth requirement specification that specifies, for a particular tenant, a total bandwidth per virtual machine. In this example, the specified total bandwidth per virtual machine is allocated to each virtual machine associated with the tenant. For example if the specified total bandwidth is 50 Mbps, then each virtual machine associated with the tenant has a bandwidth allocation of 50 Mbps. In an example implementation, the specified total bandwidth for a particular VM is dynamically allocated between the inbound VM-level queue and the outbound VM-level queue. In an alternate implementation, the specified total bandwidth for a particular VM may be divided equally between the inbound VM-level queue and the outbound VM-level queue. In an example implementation, BRS 422(2) is scalable such that, if the number of virtual machines associated with the tenant changes (e.g., more VMs are added or VMs are deleted), the specified total bandwidth per VM remains the same, but the total bandwidth for the tenant increases or decreases dynamically as VMs are added or deleted. In an alternate implementation, scalability may be controlled based on a user input. For example, a user may choose to allow scalability or may choose to be notified when a VM is added or deleted to be given the opportunity to re-specify the per-VM bandwidth.

Example BRS 422(3) represents a bandwidth requirement specification that specifies, for a particular tenant, an inbound bandwidth per VM and an outbound bandwidth per VM. In this example, the specified inbound bandwidth is allocated to each VM associated with the tenant, and the specified outbound bandwidth is allocated to each VM associated with the tenant. For example, if BRS 422(3) specifies an inbound bandwidth per VM of 50 Mbps and an outbound bandwidth per VM of 100 Mbps, then each VM associated with the tenant will have an inbound queue that supports receiving data at 50 Mbps and an outbound queue that supports sending data at 100 Mbps.

Example BRS 422(4) represents a bandwidth requirement specification that specifies, for a particular tenant, an inter-tenant total bandwidth. In this example, the specified inter-tenant total bandwidth is allocated between the tenant-level inbound queue and the tenant-level outbound queue associated with the tenant. In an example implementation, the specified inter-tenant total bandwidth may be equally divided between the tenant level-inbound queue and the tenant-level outbound queue. In an alternate implementation, the specified inter-tenant total bandwidth is dynamically allocated between the tenant level-inbound queue and the tenant-level outbound queue based on current data transmissions.

Example BRS 422(5) represents a bandwidth requirement specification that specifies, for a particular tenant, an inter-tenant inbound bandwidth and an inter-tenant outbound bandwidth. In this example, the inter-tenant inbound bandwidth specifies a bandwidth for the tenant-level inbound queue associated with the tenant, and the inter-tenant outbound bandwidth specifies a bandwidth for the tenant-level outbound queue associated with the tenant.

Example BRS 422(p) represents a bandwidth requirement specification that defines a group, and specifies inbound and outbound bandwidths for the group. In an example implementation, a tenant may define one or more groups, each group consisting of one or more virtual machines associated with the tenant. In such a scenario, each virtual machine associated with the group is allocated the specified group inbound bandwidth and the specified group outbound bandwidth. Although not illustrated in FIG. 5, bandwidth requirement specifications may include any combination of specificity. For example, a bandwidth requirement may pertain to a tenant, a virtual machine associated with a tenant, a group of tenants, a group of virtual machines associated with a single tenant, a group of virtual machines associated with a plurality of tenants, and so on. Furthermore, a bandwidth specification may specify any combination of an inbound bandwidth, an outbound bandwidth, or a total bandwidth.

In an example implementation, a tenant may create multiple bandwidth requirement specifications. If a particular VM is referenced in multiple bandwidth requirement specifications, a policy may be implemented to determine which bandwidth requirement specification will govern data transmissions to or from the particular VM. For example, a tenant may create a BRS similar to BRS 422(3) to define inbound and outbound bandwidth requirements for each VM associated with the tenant. The tenant may also create a BRS similar to BRS 422(p) to define a group consisting of a subset of VMs associated with the tenant. In an example implementation, for the VMs associated with the group, BRS 422(p) may override any bandwidth requirements specified in BRS 422(3).

As described above, BRS 422(p) may define a group of VMs associated with a single tenant. In an alternate implementation, BRS 422(p) may define a group of VMs associated with multiple tenants. For example, a group-level BRS may be used to specify bandwidth requirements for VMs of a particular type, across multiple tenants. For example, a first group-level BRS may be used to specify bandwidth requirements for VMs that provide an authorization service, and a second group-level BRS may be used to specify bandwidth requirements for VMs that provide a storage service. In this example scenario, the VMs associated with the group may not all be associated with the same tenant.

Example Bandwidth Requirement Specification User Interface

FIGS. 6-10 illustrate various example user interface screens that may be implemented to facilitate specifying bandwidth requirements as described herein.

FIG. 6 illustrates an example user interface screen 600 through which a tenant may specify intra-tenant bandwidth requirements. Screen area 602 provides tenants an opportunity to specify a number of virtual machines to be hosted. If this is a tenant's first interaction with the multi-tenant datacenter, the tenant can specify an initial number of virtual machines to be created and managed according to the bandwidth specification. Alternatively, a tenant may leave this section blank. In this scenario, any existing or future virtual machines associated with the tenant will be associated with the bandwidth requirements that are specified.

Screen area 604 provides a checkbox to indicate that the tenant chooses to not specify any bandwidth requirements. If the tenant marks this checkbox, any virtual machines associated with the tenant will send and receive data through the best effort queues 114, described above with reference to FIG. 1.

Screen area 606 provides an opportunity for a tenant to specify inbound and outbound bandwidth requirements to be applied to each virtual machine associated with the tenant. In the illustrated example, a tenant may specify inbound and/or outbound bandwidth in terms of packets per second or bits per second. If the tenant specifies inbound and outbound bandwidth requirements in screen area 606, a bandwidth requirement specification similar to BRS 422(3) may be generated.

Screen area 608 provides an opportunity for a tenant to specify a required total bandwidth to be applied to each virtual machine associated with the tenant. If the tenant specifies a total bandwidth in screen area 608, a bandwidth requirement specification similar to BRS 422(2) may be generated.

FIGS. 7-10 illustrate a series of example user interface screens through which a tenant may specify bandwidth requirements. FIG. 7 illustrates an introductory screen 700 through which the tenant may specify the type of bandwidth requirements they are requesting. Checkbox 702 enables a tenant to specify bandwidth guarantee requirements in terms of a total bandwidth to be shared across any virtual machines associated with the tenant. Checkbox 704 enables a tenant to specify bandwidth guarantee requirements in terms of total bandwidth per virtual machine Checkbox 706 enables a tenant to specify bandwidth guarantee requirements in terms of inbound and outbound bandwidth per virtual machine Checkbox 708 enables a tenant to specify bandwidth guarantee requirements in terms of total bandwidth for data transmissions to and/or from other services. Checkbox 710 enables a tenant to specify bandwidth guarantee requirements in terms of inbound and outbound bandwidth for data transmissions to and/or from other services. Checkbox 712 enables a tenant to specify that they would prefer to utilize the best-effort queues for sending and receiving data. Checkbox 714 enables the tenant to enable a feature through which the datacenter continuously monitors bandwidth usage and may adjust a tenant's bandwidth requirement specification based on actual usage to reduce cost and/or increase performance.

FIG. 8 illustrates an example user interface screen 800 for specifying a total bandwidth to be shared across the tenant's virtual machines. For example, if a tenant selects checkbox 702 and then selects the "Next" button 716, example screen 800 may be displayed. In the illustrated example, a tenant may select any of the displayed checkboxes to specify a total bandwidth in terms of either packets per second or bits per second. The specific values illustrated in FIG. 8 are merely examples and in alternate implementations, any type of total bandwidth indicators may be represented in a similar user interface screen. If a tenant specifies a total bandwidth through screen 800, a bandwidth requirement specification similar to BRS 422(1) may be generated.

FIG. 9 illustrates an example user interface screen 900 for specifying inbound and outbound bandwidth per virtual machine. For example, if a tenant selects checkbox 706 and then selects the "Next" button 716, example screen 900 may be displayed. In the illustrated example, a tenant may select any of the displayed checkboxes from the left column to specify an inbound bandwidth per virtual machine in terms of Megabits per second, and the tenant may select any of the displayed checkboxes from the right column to specify an outbound bandwidth per virtual machine. In the example illustrated in FIG. 9, the options for guaranteed inbound and outbound bandwidth are tied to specific costs. The specific values illustrated in FIG. 9 are merely examples and in alternate implementations, any type of bandwidth indicators, such as packets per second or some other combination, may be represented in a similar user interface screen.

FIG. 10 illustrates an example user interface screen 1000 for specifying inbound and outbound bandwidth for interactions with various types of services. For example, if a tenant selects checkbox 710 and then selects the "Next" button 716, example screen 1000 may be displayed. In the illustrated example, a tenant may select a combination of any of the displayed checkboxes to specify an inbound bandwidth and an outbound bandwidth for data transmissions between the tenant and storage services, between the tenant and authentication services, and/or between the tenant and other services. In the illustrated example, the specified bandwidth guarantees are applied to the tenant-level queues associated with the tenant. In an alternate implementation, a similar user interface screen may allow a tenant to specify different bandwidth requirements for different types of VMs (e.g., small VM, medium VM, large VM, or extra-large VM) within the same tenant. For example, if the tenant implements a three-tier web service, the bandwidth requirement for transmission between VMs associated with an application and VMs associated with a back-end database tier may be higher than a bandwidth requirement for transmission between VMs associated with a front-end and the VMs associated with the application.

Implementing Bandwidth Requirement Specifications

Figure 11:
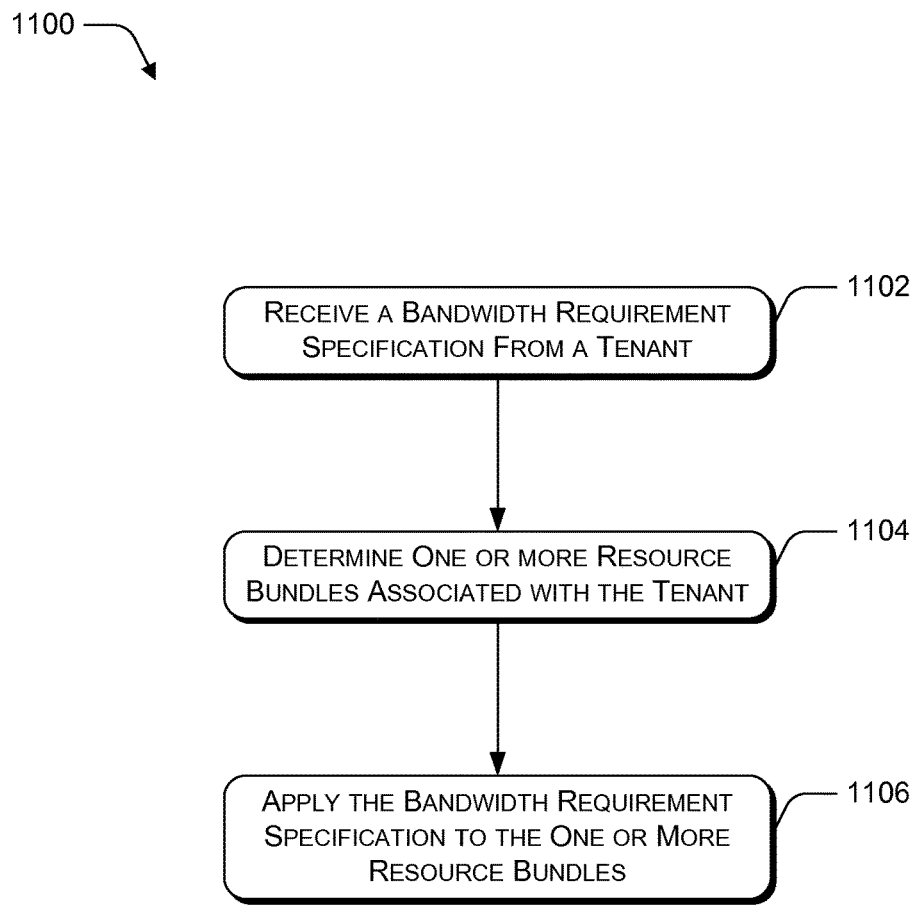
FIG. 11 is a flow diagram of an example method for implementing a bandwidth specification.
Figure 12:
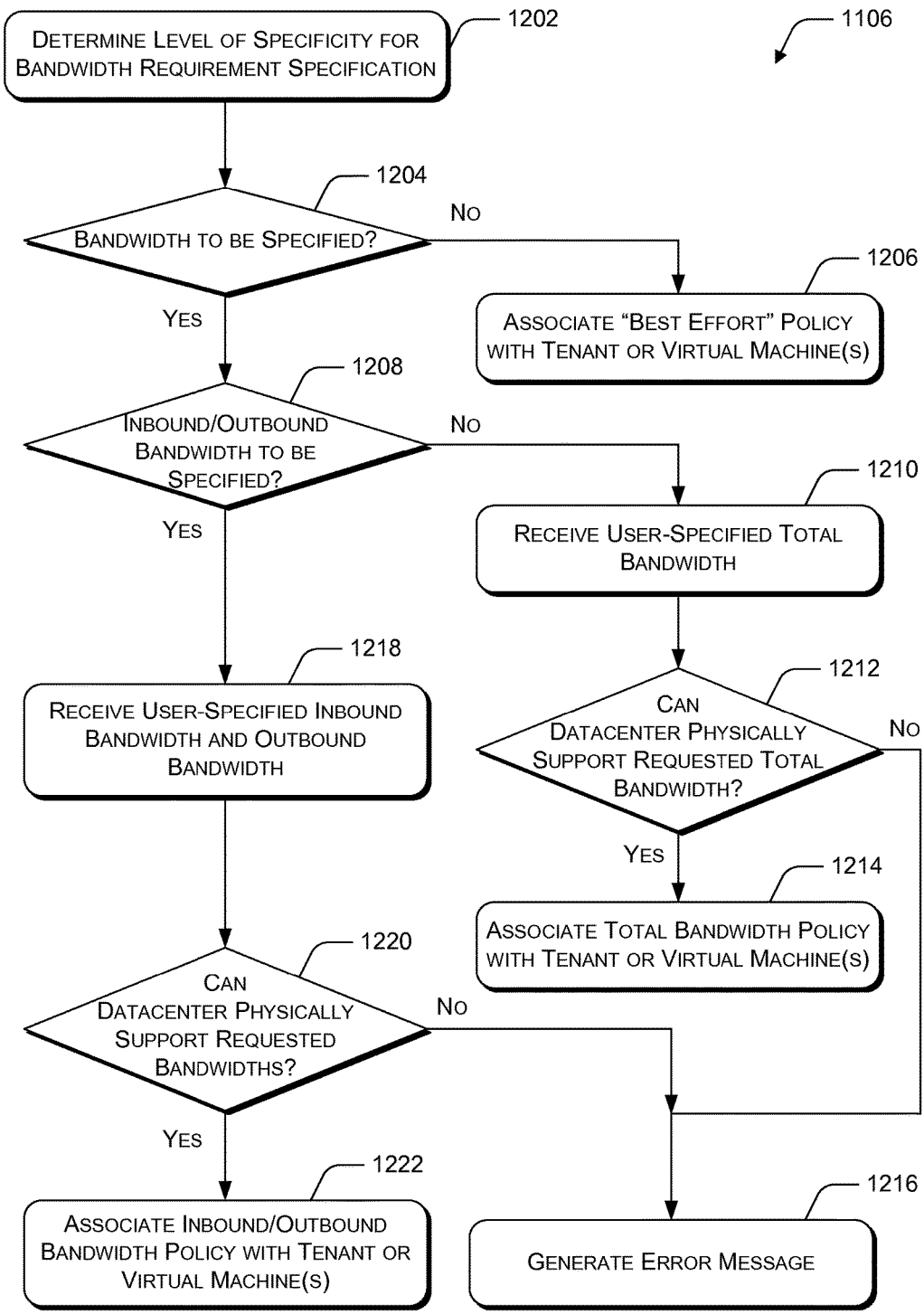
FIG. 12 is a flow diagram of an example method for applying a bandwidth requirement specification to one or more resource bundles.

FIGS. 11 and 12 illustrate an example process 1100 for implementing a bandwidth requirement specification received from a tenant. The process is illustrated as a set of operations shown as discrete blocks. The process may be implemented in any suitable hardware, software, firmware, or combination thereof. The order in which the operations are described is not to be construed as a limitation.

At block 1102, a multi-tenant datacenter receives a bandwidth requirement specification from a tenant. For example, referring to FIGS. 6-10, a tenant may interact with a user interface to specify bandwidth requirements. As illustrated in FIG. 4, virtual network switch 402 may store the bandwidth requirement specification 426.

At block 1104, the multi-tenant datacenter determines one or more resource bundles associated with the tenant. For example, virtual network switch 402 may utilize the queue management module 428 to determine specific virtual machines that are associated with the tenant.

At block 1106, the multi-tenant datacenter applies the bandwidth requirement specification to the one or more resource bundles associated with the tenant. For example, virtual network switch 402 may utilize the queue management module 428 to update the bandwidth allocations associated with each VM-level queue 420 associated with the tenant.

FIG. 12 illustrates an example process 1106 for applying a bandwidth requirement specification to resource bundles associated with a tenant.

At block 1202, the multi-tenant data center determines a level of specificity associated with a received bandwidth requirement specification. For example, virtual network switch 402 examines a received bandwidth requirement specification 426 to determine whether bandwidth requirements are being specified at all, at a group level, at the tenant level, or at the virtual machine level. If bandwidth requirements are being specified at the group level, the tenant level, or the virtual machine level, the virtual network switch 402 also determines whether the bandwidth requirement specification specifies a total bandwidth or specifies inbound and outbound bandwidths.

At block 1204, virtual network switch 402 determines whether the tenant has specified a bandwidth requirement. In an event that a bandwidth has not been specified (the "No" branch from block 1204), then at block 1206, queue management module 428 associates a best effort policy with the tenant. For example, the bandwidth requirement specification may indicate that the best effort queues 424 are to be used for each VM associated with the tenant. In an alternate example, the bandwidth requirement specification may indicate that the best effort queues 424 are to be used instead of tenant-level queues for the tenant.

On the other hand, if a bandwidth has been specified (the "Yes" branch from block 1204), then at block 1208, virtual network switch 402 determines whether the tenant has specified a total bandwidth or has specified inbound and outbound bandwidths. In an event that the tenant has specified a total bandwidth (the "No" branch from block 1208), then at block 1210, queue management module 428 receives the user-specified total bandwidth. For example, the tenant may submit a total bandwidth through a user interface similar to the user interface screens shown in FIG. 6 or 8.

At block 1212, virtual network switch 402 determines whether the multi-tenant datacenter 102 can physically support the requested total bandwidth. If the datacenter is able to physically support the requested bandwidth requirement (the "Yes" branch from block 1212), then at block 1214, the multi-tenant datacenter 102 associates the received bandwidth requirement specification with the virtual machines or tenant to which the bandwidth requirement specification applies. For example, if the specified total bandwidth is to be applied to each virtual machine associated with the tenant or with a group, then the bandwidths for the VM-level queues 420 associated with the tenant or group may be updated according to the bandwidth requirement specification. However, if the specified total bandwidth is to be applied at the tenant level, then the bandwidths for the tenant-level queues 422 associated with the tenant may be updated according to the bandwidth requirement specification.

On the other hand, if the data center is not able to physically support the requested total bandwidth (the "No" branch from block 1212), then at block 1216, an error message is generated. For example, the multi-tenant datacenter 102 may render a user interface screen that indicates that the multi-tenant datacenter cannot support the requested bandwidth requirement specification. The user interface may include recommendations for bandwidth requests that the datacenter can support.

Referring back to block 1208, in an event that the tenant has specified an inbound bandwidth and an outbound bandwidth (the "Yes" branch from block 1208), then at block 1218, queue management module 428 receives the user-specified inbound bandwidth and outbound bandwidth. For example, the tenant may submit inbound and outbound bandwidths through a user interface similar to the user interface screens shown in FIG. 6, 9, or 10.

At block 1220, virtual network switch 402 determines whether the multi-tenant datacenter 102 can physically support the requested inbound and outbound bandwidths. If the datacenter is able to physically support the requested bandwidth requirement (the "Yes" branch from block 1220), then at block 1222, the multi-tenant datacenter 102 associates the received bandwidth requirement specification with the virtual machines or tenant to which the bandwidth requirement specification applies. For example, if the specified inbound and outbound bandwidths are to be applied to each virtual machine associated with the tenant, then the bandwidths for the VM-level queues 420 associated with the tenant may be updated according to the bandwidth requirement specification. However, if the specified total bandwidth is to be applied at the tenant level, then the bandwidths for the tenant-level queues 422 associated with the tenant may be updated according to the bandwidth requirement specification.

On the other hand, if the data center is not able to physically support the requested total bandwidth (the "No" branch from block 1220), then at block 1216, an error message is generated. For example, the multi-tenant datacenter 102 may render a user interface screen that indicates that the multi-tenant datacenter cannot support the requested bandwidth requirement specification. The user interface may include recommendations for bandwidth requests that the datacenter can support.

In an example implementation, it may be determined (at block 1220) that the requested bandwidths may be supported for some resource bundles, but not for others. In such a scenario, the queue bandwidths (e.g., VM-level queues, tenant level queues, or queues associated with group members) may be updated when possible (according to block 1222), and an error message may be generated for others (according to block 1216).

Figure 13:
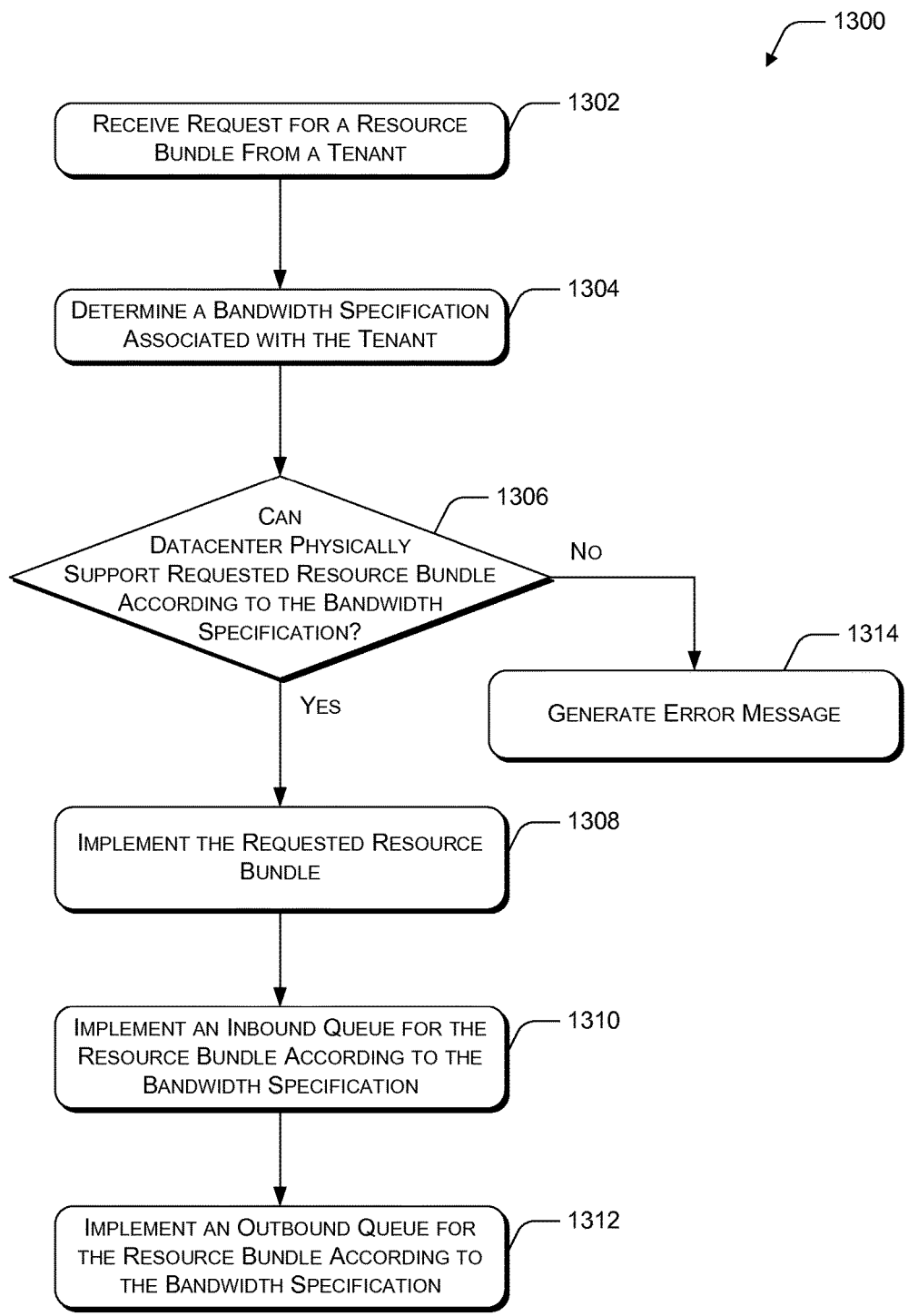
FIG. 13 is a flow diagram of an example method for implementing a resource bundle according to a bandwidth specification.

FIG. 13 illustrates an example process 1300 for creating a resource bundle for a tenant having a bandwidth requirement specification. The process is illustrated as a set of operations shown as discrete blocks. The process may be implemented in any suitable hardware, software, firmware, or combination thereof. The order in which the operations are described is not to be construed as a limitation.

At block 1302, a multi-tenant datacenter receives a request to implement a resource bundle for a tenant. For example, referring to FIG. 6, a tenant may interact with a user interface to request any number of virtual machines to be hosted by the multi-tenant datacenter.

At block 1304, the multi-tenant datacenter determines a bandwidth specification associated with the tenant. For example, as illustrated in FIG. 4, virtual network switch 402 may store a bandwidth requirement specification 426 that the tenant previously specified.

At block 1306, virtual network switch 402 determines whether the multi-tenant datacenter 102 can physically support the requested resource bundle in light of the bandwidth requirement specification. If the datacenter is able to physically support the requested resource bundle (the "Yes" branch from block 1306), then at block 1308, the multi-tenant datacenter multi-tenant datacenter 102 implements the requested resource bundle. For example, VM placement module 406 may create a virtual machine 108.

At block 1310, an inbound queue is implemented for the resource bundle according to the bandwidth specification and at block 1312, an outbound queue is implemented for the resource bundle according to the bandwidth specification. For example, queue management module 428 may create VM-level queues 420 associated with the created virtual machine Queue management module 428 may establish bandwidth for the created VM-level queues according to the bandwidth requirement specification 426. Bandwidth associated with tenant level queues 422 may also be updated.

On the other hand, if the data center is not able to physically support the requested resource bundle (the "No" branch from block 1306), then at block 1314, an error message is generated. For example, the multi-tenant datacenter 102 may render a user interface screen that indicates that the multi-tenant datacenter cannot support the requested resource bundle according to the existing bandwidth requirement specification.

As described above, FIG. 11 and FIG. 12 illustrate a process for implementing a bandwidth requirement specification received from a tenant, and FIG. 13 illustrates a process for creating a resource bundle for a tenant having a bandwidth requirement specification. A combination of operations described with reference to FIGS. 11-13 may be implemented to create an initial set of resource bundles with an associated bandwidth requirement specification for a particular tenant. For example, if a new tenant requests to create one or more virtual machines, and submits a bandwidth requirement specification, determinations will be made regarding both whether or not the data center can physically support the requested bandwidths and whether or not the data center can physically support the requested virtual machines according to the requested bandwidths.

Figure 14:
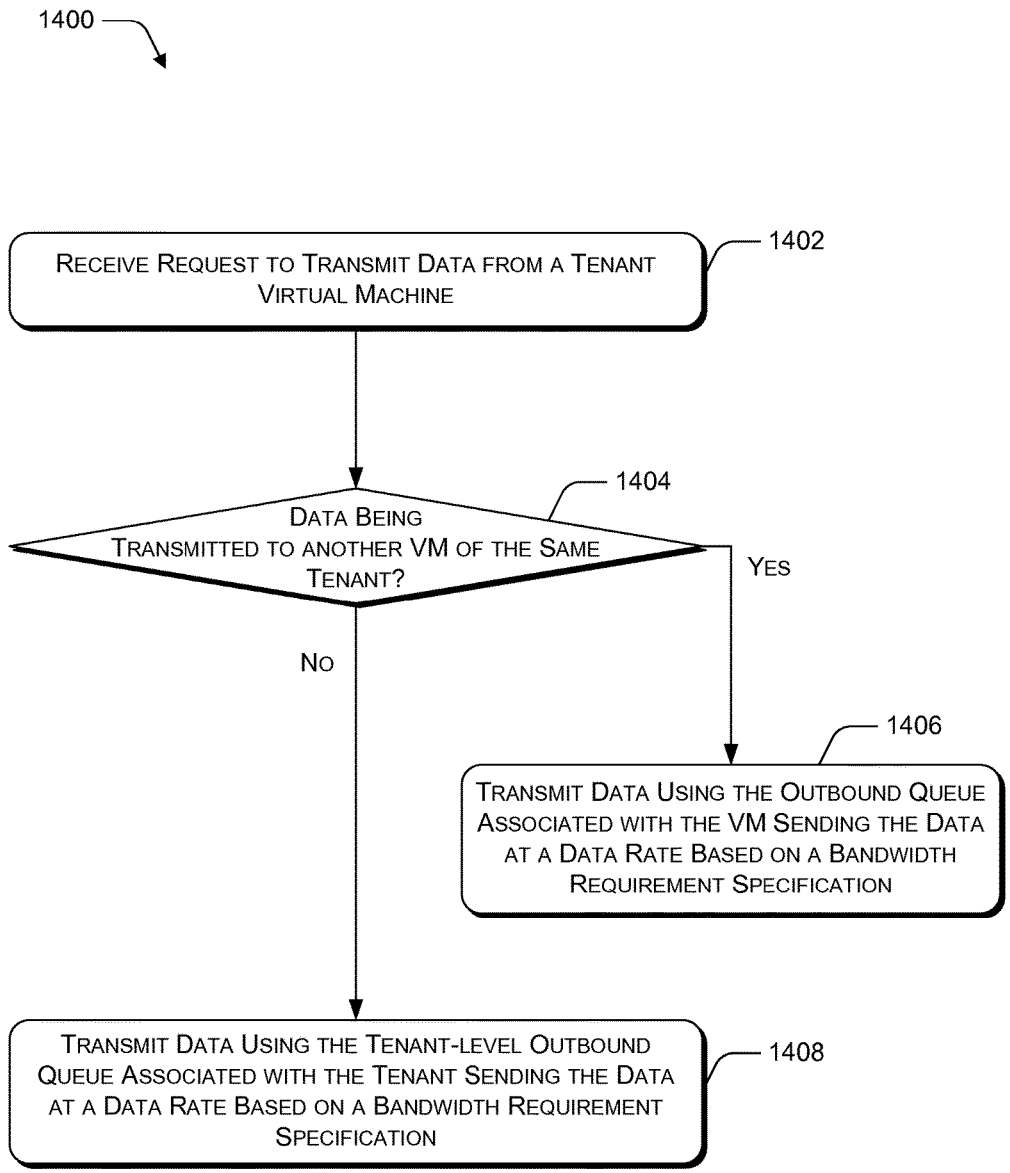
FIG. 14 is a flow diagram of an example method for queuing data for transmission based on a bandwidth requirement specification.

FIG. 14 illustrates an example process 1400 for transmitting data according to a bandwidth requirement specification. The process is illustrated as a set of operations shown as discrete blocks. The process may be implemented in any suitable hardware, software, firmware, or combination thereof. The order in which the operations are described is not to be construed as a limitation.

At block 1402, virtual network switch 402 receives a request to transmit data from a tenant virtual machine.

At block 1404, virtual network switch 402 determines whether the data is being transmitted to another virtual machine associated with the same tenant. If the data is being transmitted to another virtual machine associated with the same tenant (the "Yes" branch from block 1404), then at block 1406, data traffic management module 404 directs the data to be transmitted via the outbound VM-level queue associated with the virtual machine that requested to transmit data. Data traffic management module 404 controls the rate at which data moves through the outbound VM-level queue based on a bandwidth requirement specification 426 such that the rate at which data moves through the outbound VM-level queue satisfies bandwidth guarantees in the bandwidth requirement specification.

On the other hand, if the data is being transmitted to an entity not associated with the same tenant (the "No" branch from block 1404), then at block 1408, data traffic management module 404 directs the data to be transmitted via the outbound tenant-level queue associated with the tenant that is sending the data. Data traffic management module 404 controls the rate at which data moves through the outbound tenant-level queue based on a bandwidth requirement specification 426 such that the rate at which data moves through the outbound tenant-level queue satisfies bandwidth guarantees in the bandwidth requirement specification.

Figure 15:
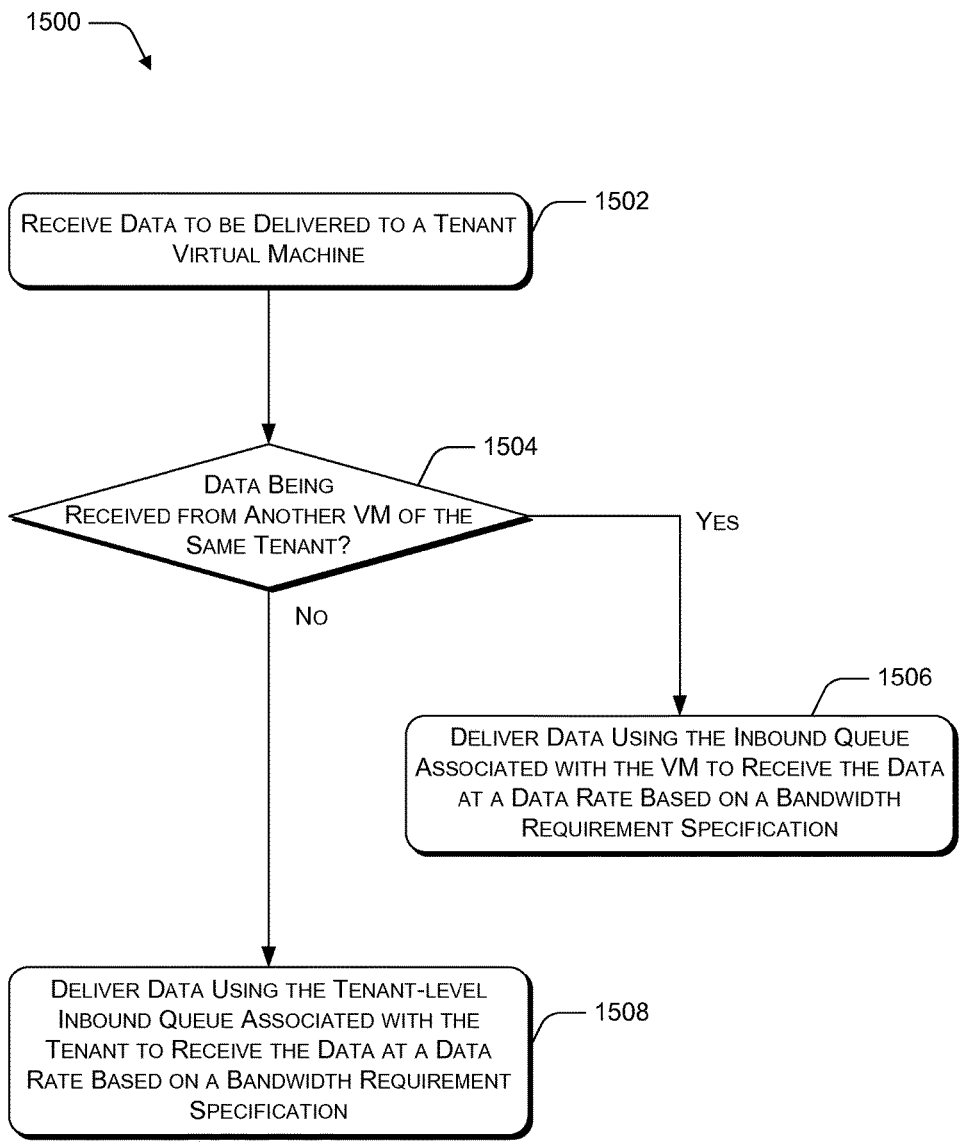
FIG. 15 is a flow diagram of an example method for queuing data being received based on a bandwidth requirement specification.

FIG. 15 illustrates an example process 1500 for receiving data according to a bandwidth requirement specification. The process is illustrated as a set of operations shown as discrete blocks. The process may be implemented in any suitable hardware, software, firmware, or combination thereof. The order in which the operations are described is not to be construed as a limitation.

At block 1502, virtual network switch 402 receives data to be delivered to a tenant virtual machine.

At block 1504, virtual network switch 402 determines whether the data is being received from another virtual machine associated with the same tenant. If the data is being received from another virtual machine associated with the same tenant (the "Yes" branch from block 1504), then at block 1506, data traffic management module 404 directs the data to be received via the inbound VM-level queue associated with the virtual machine that is to receive the data. Data traffic management module 404 controls the rate at which data moves through the inbound VM-level queue based on a bandwidth requirement specification 426 such that the rate at which data moves through the inbound VM-level queue satisfies bandwidth guarantees in the bandwidth requirement specification.

On the other hand, if the data is being received from an entity not associated with the same tenant (the "No" branch from block 1504), then at block 1508, data traffic management module 404 directs the data to be received via the inbound tenant-level queue associated with tenant that is to receive the data. Data traffic management module 404 controls the rate at which data moves through the inbound tenant-level queue based on a bandwidth requirement specification 426 such that the rate at which data moves through the inbound tenant-level queue satisfies bandwidth guarantees in the bandwidth requirement specification.

Example Clauses

A: A method, comprising: receiving a bandwidth requirement specification for a tenant, the tenant having one or more resource bundles; and for an individual resource bundle of the one or more resource bundles: implementing an inbound queue associated with the resource bundle, wherein a rate at which data is received through the inbound queue is determined according to the bandwidth requirement specification, the inbound queue being utilized to receive data from other resource bundles of the one or more resource bundles associated with the tenant; and implementing an outbound queue associated with the resource bundle, wherein a rate at which data is sent through the outbound queue is determined according to the bandwidth requirement specification, the outbound queue being utilized to send data to other resource bundles of the one or more resource bundles associated with the tenant.

B: A method as Paragraph A recites, wherein at least one resource bundle of the one or more resource bundles comprises a virtual machine.

C: A method as either Paragraph A or B recites, wherein: the one or more resource bundles comprises a first group of resource bundles; the bandwidth requirement specification is a first bandwidth requirement specification; the tenant has associated therewith a second group of one or more resource bundles; receiving a second bandwidth requirement specification for the tenant; and for an individual resource bundle of the second group of resource bundles: implementing an inbound queue associated with the resource bundle, wherein a rate at which data is received through the inbound queue is determined according to the second bandwidth requirement specification, the inbound queue being utilized to receive data from other resource bundles associated with the tenant; and implementing an outbound queue associated with the resource bundle, wherein a rate at which data is sent through the outbound queue is determined according to the second bandwidth requirement specification, the outbound queue being utilized to send data to other resource bundles associated with the tenant.

D: A method as any of Paragraphs A-C recites, wherein: the bandwidth requirement specification indicates a total bandwidth for the resource bundle; and the inbound queue associated with the resource bundle and the outbound queue associated with the resource bundle are implemented such that, at any given time, a sum of a bandwidth available for use by the inbound queue associated with the resource bundle and a bandwidth available for use by the outbound queue associated with the resource bundle supports the total bandwidth for the resource bundle indicated in the bandwidth requirement specification.

E: A method as any of Paragraphs A-C recite, wherein: the bandwidth requirement specification indicates a total bandwidth for the tenant; and the inbound queues associated with each resource bundle of the one or more resource bundles and the outbound queues associated with each resource bundle of the one or more resource bundles are implemented such that, at any given time, a sum of a bandwidth available for use by the inbound queues associated with the one or more resource bundles and a bandwidth available for use by the outbound queues associated with the one or more resource bundles supports the total bandwidth for the tenant indicated in the bandwidth requirement specification.

F: A method as any of Paragraphs A-C recite, wherein: the bandwidth requirement specification indicates an inbound bandwidth for the resource bundle and an outbound bandwidth for the resource bundle; the inbound queue associated with the resource bundle is implemented such that, at any given time, a bandwidth available for use by the inbound queue associated with the resource bundle supports the inbound bandwidth for the resource bundle indicated in the bandwidth requirement specification; and the outbound queue associated with the resource bundle is implemented such that, at any given time, a bandwidth available for use by the outbound queue associated with the resource bundle supports the outbound bandwidth for the resource bundle indicated in the bandwidth requirement specification.

G: A method as any of Paragraphs A-F recites, further comprising: implementing a tenant-level inbound queue associated with the tenant for receiving data from resources not associated with the tenant; and implementing a tenant-level outbound queue associated with the tenant for sending data to resources not associated with the tenant.

H: A method as Paragraph G recites, further comprising: receiving a request to transmit data from the resource bundle associated with the tenant to another entity; in an event that the other entity is another resource bundle associated with the tenant, utilizing the outbound queue associated with the resource bundle to transmit the data; and in an event that the other entity is not another resource bundle associated with the tenant, utilizing the tenant-level outbound queue to transmit the data.

I: A method as Paragraph H recites, further comprising: in the event that the other entity is another resource bundle associated with the tenant, transmitting the data to an inbound queue of the other resource bundle associated with the tenant.

J: A method as Paragraph H recites, further comprising: in the event that the other entity is not another resource bundle associated with the tenant, transmitting the data to a tenant-level inbound queue of the other entity.

K: A method as any of Paragraphs A-J recites, further comprising: charging the tenant a fee to maintain the one or more resource bundles, wherein the fee is based at least in part on the bandwidth requirement specification.

L: A multi-tenant datacenter system configured to perform a method as any of Paragraphs A-K recites.

M: One or more computer-readable media comprising computer executable instructions that, when executed, direct a computing system to perform a method as any of Paragraphs A-K recites.

N: A system, comprising: a bandwidth specification associated with a first tenant; one or more resource bundles associated with the first tenant; and for an individual resource bundle of the one or more resource bundles associated with the first tenant: an inbound queue for receiving data, wherein a rate at which data may be received through the inbound queue is determined according to the bandwidth specification; and an outbound queue for sending data, wherein a rate at which data may be sent through the outbound queue is determined according to the bandwidth specification.

O: The system as Paragraph N recites, wherein the inbound queue is configured to receive data from any other resource bundle of the one or more resource bundles associated with the first tenant.

P: The system as either Paragraph N or O, wherein the outbound queue is configured to send data to any other resource bundle of the one or more resource bundles associated with the first tenant.

Q: The system as any of Paragraphs N-P recites, further comprising: a tenant-level inbound queue associated with the first tenant for receiving data, wherein a rate at which data may be received through the tenant-level inbound queue is determined according to the bandwidth specification; and a tenant-level outbound queue associated with the first tenant for sending data, wherein a rate at which data may be sent through the tenant-level outbound queue is determined according to the bandwidth specification.

R: The system as Paragraph Q recites, wherein the tenant-level inbound queue is configured to receive data from an entity that is not associated with the first tenant.

S: The system as either Paragraph Q or R recites, wherein the tenant-level outbound queue is configured to send data to an entity that is not associated with the first tenant.

T: The system as any of Paragraphs Q-S recites, wherein: the bandwidth specification indicates a minimum bandwidth to be enforced for the inbound queue of each resource bundle associated with the first tenant; and a minimum bandwidth of the tenant-level inbound queue is determined based at least in part on the minimum bandwidth to be enforced for the inbound queue of each resource bundle associated with the first tenant.

U: The system as any of Paragraphs Q-S recites, wherein: the bandwidth specification indicates a minimum bandwidth to be enforced for the inbound queue of each resource bundle associated with the first tenant; and a minimum bandwidth of the tenant-level inbound queue is determined based at least in part on a sum of the minimum bandwidths to be enforced for the inbound queue of each resource bundle associated with the first tenant.

V: The system as any of Paragraphs Q-U recites, wherein: the bandwidth specification indicates a minimum bandwidth to be enforced for the outbound queue of each resource bundle associated with the first tenant; and a minimum bandwidth of the tenant-level outbound queue is determined based at least in part on the minimum bandwidth to be enforced for the outbound queue of each resource bundle associated with the first tenant.

W: The system as any of Paragraphs Q-U recites, wherein: the bandwidth specification indicates a minimum bandwidth to be enforced for the outbound queue of each resource bundle associated with the first tenant; and a minimum bandwidth of the tenant-level outbound queue is determined based at least in part on a sum of the minimum bandwidths to be enforced for the outbound queue of each resource bundle associated with the first tenant.

X: The system as any of Paragraphs N-W recites, wherein at least one of the one or more resource bundles associated with the first tenant comprises a virtual machine.

Y: A system, comprising: a plurality of server computers; and a virtual network switch to provide a logical model of resources available via the plurality of server computers, wherein the logical model includes: one or more tenants; for individual tenants: a tenant-level inbound queue; a tenant-level outbound queue; one or more resource bundles; and for each resource bundle: a resource bundle-level inbound queue; and a resource bundle-level outbound queue; and a queue management module to implement the tenant-level inbound queues, the tenant-level outbound queues, the resource bundle-level inbound queues, and the resource-level outbound queues according to one or more bandwidth requirement specifications.

Z: A system as Paragraph Y recites, wherein the queue management module comprises an application programming interface.

AA: A system as either Paragraph Y or Z recites, wherein the logical model further comprises: a best effort inbound queue for receiving data at a resource bundle that does not have an associated bandwidth requirement specification; and a best effort outbound queue for transmitting data from a resource bundle that does not have an associated bandwidth requirement specification.

AB: A system as any of Paragraphs Y-AA recites, wherein the system further comprises a data traffic management module that is configured to manage data ingress and data egress through the tenant-level inbound queues, the tenant-level outbound queues, the resource bundle-level inbound queues, and the resource-level outbound queues.

AC: A system as Paragraph AB recites, wherein the data traffic management module comprises an application programming interface.

AD: A system as any of Paragraphs Y-AC recite, wherein the system further comprises a resource bundle placement module that is configured to physically implement a resource bundle within the plurality of server computers based, at least in part, on the one or more bandwidth requirement specifications.

AE: A system as Paragraph AD recites, wherein the resource bundle placement module is further configured to verify, prior to implementing the resource bundle, that the system can physically support the resource bundle.

AF: A system as Paragraph AD recites, wherein the resource bundle placement module is further configured to verify, prior to implementing the resource bundle, that the system can physically support the resource bundle within constraints of the one or more bandwidth requirement specifications AG: A system as any of Paragraphs AD-AF recites, wherein the resource bundle placement module is further configured to verify, prior to implementing a particular bandwidth requirement specification, that the system can physically support the particular bandwidth requirement specification.

CONCLUSION

Although network resource governance in multi-tenant datacenters has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 104 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

I claim:

1. A method, comprising:
   receiving a bandwidth requirement specification for a tenant, the tenant having one or more resource bundles; and
   for an individual resource bundle of the one or more resource bundles:
      implementing an inbound queue associated with the resource bundle, wherein a rate at which data is received through the inbound queue is determined according to the bandwidth requirement specification, the inbound queue being utilized to receive data; and
      implementing an outbound queue associated with the resource bundle, wherein a rate at which data is sent through the outbound queue is determined according to the bandwidth requirement specification, the outbound queue being utilized to send data.

2. A method as recited in claim 1, wherein at least one resource bundle of the one or more resource bundles comprises a virtual machine.

3. A method as recited in claim 1, wherein:
   the one or more resource bundles comprises a first group of resource bundles;
   the bandwidth requirement specification is a first bandwidth requirement specification;
   the tenant has associated therewith a second group of one or more resource bundles;
   receiving a second bandwidth requirement specification for the tenant; and
   for an individual resource bundle of the second group of resource bundles:
      implementing an inbound queue associated with the resource bundle, wherein a rate at which data is received through the inbound queue is determined according to the second bandwidth requirement specification, the inbound queue being utilized to receive data; and
      implementing an outbound queue associated with the resource bundle, wherein a rate at which data is sent through the outbound queue is determined according to the second bandwidth requirement specification, the outbound queue being utilized to send data.

4. A method as recited in claim 1, wherein:
   the bandwidth requirement specification indicates a total bandwidth for the resource bundle; and
   the inbound queue associated with the resource bundle and the outbound queue associated with the resource bundle are implemented such that, at any given time, a sum of a bandwidth available for use by the inbound queue associated with the resource bundle and a bandwidth available for use by the outbound queue associated with the resource bundle supports the total bandwidth for the resource bundle indicated in the bandwidth requirement specification.

5. A method as recited in claim 1, wherein:
   the bandwidth requirement specification indicates a total bandwidth for the tenant; and
   the inbound queues associated with each resource bundle of the one or more resource bundles and the outbound queues associated with each resource bundle of the one or more resource bundles are implemented such that, at any given time, a sum of a bandwidth available for use by the inbound queues associated with the one or more resource bundles and a bandwidth available for use by the outbound queues associated with the one or more resource bundles supports the total bandwidth for the tenant indicated in the bandwidth requirement specification.

6. A method as recited in claim 1, wherein:
   the bandwidth requirement specification indicates an inbound bandwidth for the resource bundle and an outbound bandwidth for the resource bundle;
   the inbound queue associated with the resource bundle is implemented such that, at any given time, a bandwidth available for use by the inbound queue associated with the resource bundle supports the inbound bandwidth for the resource bundle indicated in the bandwidth requirement specification; and
   the outbound queue associated with the resource bundle is implemented such that, at any given time, a bandwidth available for use by the outbound queue associated with the resource bundle supports the outbound bandwidth for the resource bundle indicated in the bandwidth requirement specification.

7. A method as recited in claim 1, further comprising:
   implementing a tenant-level inbound queue associated with the tenant for receiving data from resources not associated with the tenant; and
   implementing a tenant-level outbound queue associated with the tenant for sending data to resources not associated with the tenant.

8. A method as recited in claim 7, further comprising:
receiving a request to transmit data from the resource bundle associated with the tenant to another entity;
in an event that the other entity is another resource bundle associated with the tenant, utilizing the outbound queue associated with the resource bundle to transmit the data; and
in an event that the other entity is not another resource bundle associated with the tenant, utilizing the tenant-level outbound queue to transmit the data.

9. A method as recited in claim 8, further comprising:
in the event that the other entity is another resource bundle associated with the tenant, transmitting the data to an inbound queue of the other resource bundle associated with the tenant.

10. A method as recited in claim 8, further comprising:
in the event that the other entity is not another resource bundle associated with the tenant, transmitting the data to a tenant-level inbound queue of the other entity.

11. A system, comprising:
a processor;
a memory, communicatively coupled to the processor;
a bandwidth specification, stored in the memory, associated with a first tenant;
one or more resource bundles associated with the first tenant, wherein individual resource bundles of the one or more resource bundles include at least a portion of the memory or at least a portion of the processor; and
for individual resource bundles of the one or more resource bundles associated with the first tenant:
an inbound queue for receiving data, wherein a rate at which data may be received through the inbound queue is determined according to the bandwidth specification; and
an outbound queue for sending data, wherein a rate at which data may be sent through the outbound queue is determined according to the bandwidth specification.

12. The system as recited in claim 11, wherein at least one of the one or more resource bundles associated with the first tenant comprises a virtual machine.

13. The system as recited in claim 11, further comprising:
a tenant-level inbound queue associated with the first tenant for receiving data, wherein a rate at which data may be received through the tenant-level inbound queue is determined according to the bandwidth specification; and
a tenant-level outbound queue associated with the first tenant for sending data, wherein a rate at which data may be sent through the tenant-level outbound queue is determined according to the bandwidth specification.

14. The system as recited in claim 13, wherein:
the bandwidth specification indicates a minimum bandwidth to be enforced for the inbound queue of each resource bundle associated with the first tenant; and
a minimum bandwidth of the tenant-level inbound queue is determined based at least in part on the minimum bandwidth to be enforced for the inbound queue of each resource bundle associated with the first tenant.

15. The system as recited in claim 13, wherein:
the bandwidth specification indicates a minimum bandwidth to be enforced for the outbound queue of each resource bundle associated with the first tenant; and
a minimum bandwidth of the tenant-level outbound queue is determined based at least in part on the minimum bandwidth to be enforced for the outbound queue of each resource bundle associated with the first tenant.

16. A system, comprising:
a plurality of server computers; and
a virtual network switch to provide a logical model of resources available via the plurality of server computers, wherein the logical model includes:
one or more tenants;
for an individual tenant:
a tenant-level inbound queue;
a tenant-level outbound queue;
one or more resource bundles; and
for an individual resource bundle:
a resource bundle-level inbound queue; and
a resource bundle-level outbound queue; and
a queue management module to implement the tenant-level inbound queues, the tenant-level outbound queues, the resource bundle-level inbound queues, and the resource-level outbound queues according to one or more bandwidth requirement specifications.

17. A system as recited in claim 16, wherein the queue management module comprises an application programming interface.

18. A system as recited in claim 16, wherein the logical model further comprises:
a best effort inbound queue for receiving data at a resource bundle that does not have an associated bandwidth requirement specification; and
a best effort outbound queue for transmitting data from a resource bundle that does not have an associated bandwidth requirement specification.

19. A system as recited in claim 16, wherein the system further comprises a data traffic management module that is configured to manage data ingress and data egress through the tenant-level inbound queues, the tenant-level outbound queues, the resource bundle-level inbound queues, and the resource-level outbound queues.

20. A system as recited in claim 16, wherein the system further comprises a resource bundle placement module that is configured to physically implement a resource bundle within the plurality of server computers based, at least in part, on the one or more bandwidth requirement specifications.

* * * * *